United States Patent
Doddaiah et al.

(10) Patent No.: US 12,197,762 B1
(45) Date of Patent: Jan. 14, 2025

(54) REMOTE DATA INTEGRITY VERIFICATION ON A REMOTE DATA REPLICATION FACILITY

(71) Applicant: Dell Products, L.P., Hopkinton, MA (US)

(72) Inventors: Ramesh Doddaiah, Westborough, MA (US); Sandeep Chandrashekhara, Shrewsbury, MA (US); Mohammed Aamir Vt, Bangalore (IN); Mohammed Asher, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/401,642

(22) Filed: Jan. 1, 2024

(51) Int. Cl.
*G06F 3/06* (2006.01)

(52) U.S. Cl.
CPC .............. *G06F 3/065* (2013.01); *G06F 3/061* (2013.01); *G06F 3/0619* (2013.01); *G06F 3/0679* (2013.01)

(58) Field of Classification Search
CPC ....... G06F 3/0679; G06F 3/065; G06F 3/0619
See application file for complete search history.

(56) References Cited

U.S. PATENT DOCUMENTS

| | | | |
|---|---|---|---|
| 9,081,658 B2* | 7/2015 | Park | G06F 12/0238 |
| 11,036,677 B1* | 6/2021 | Grunwald | G06F 16/183 |
| 11,467,736 B1* | 10/2022 | Nipunage | G06F 9/321 |

* cited by examiner

*Primary Examiner* — Jane W Benner
(74) *Attorney, Agent, or Firm* — Anderson Gorecki LLP (57) ABSTRACT

A remote data replication facility includes a primary storage array and a backup storage array, on which tracks of data are replicated from the primary storage array to the backup storage array as they are received by the primary storage array. Remote data verification is implemented on the remote data replication facility by comparing track fingerprints, track temporal write metadata, and track spatial write metadata, for a given track on the primary storage array, with corresponding track fingerprints, track temporal write metadata, and track spatial write metadata, for the given track on the backup storage array. If any difference is determined in the combination of track fingerprints, track temporal write metadata, track spatial write metadata, for a given track, the integrity of the data at the backup storage array is not verified for the track.

16 Claims, 6 Drawing Sheets

REMOTE DATA INTEGRITY VERIFICATION ON A REMOTE DATA REPLICATION FACILITY

FIELD

This disclosure relates to computing systems and related devices and methods, and, more particularly, to a method and apparatus for remote data integrity verification on a remote data replication facility.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for remote data integrity verification on a remote data replication facility is provided. In some embodiments, when data is received at the primary storage array R1, a compression process at the primary storage array performs in-line compression at the track level or quarter track level. As part of this compression process, a fingerprint is generated that is used on the primary storage array R1 to implement deduplication. Spatial and temporal write metadata is also created for the track identifying how many times write IO operations have occurred on a particular track (temporal write metadata) and which sectors of the track have been written to over time (spatial write metadata). The received data, along with the spatial and temporal metadata, is also transmitted on a remote data replication facility to a backup storage array R2.

In some embodiments, it is important to verify that the data contained at the backup storage array R2 is the same as the data contained at the primary storage array R1. In some embodiments, to implement remote data verification on the remote data replication facility, the track fingerprint as well as track temporal write metadata and track spatial write metadata are sent from the primary storage array R1 to the backup storage array R2. The backup storage array R2 retrieves the locally stored track fingerprint and local track temporal write metadata and local track spatial write metadata, and compares the two fingerprints and two copies of the track temporal write metadata and track spatial write metadata. In response to a determination that the fingerprints and track temporal write metadata and track spatial write metadata are the same on both the primary storage array R1 and the backup storage array R2, the comparison process determines that the data is the same on both storage arrays. In response to a determination that one or more of the fingerprints, the track temporal write metadata, and the track spatial write metadata, are not the same on both the primary storage array R1 and the backup storage array R2, the comparison process determines that it is possible that the data is not the same on both storage arrays.

In some embodiments, a method of remote data integrity verification on a remote data replication facility, includes receiving a write IO operation by a primary storage array, the write IO containing data to be written to a portion of a track on the primary storage array, and creating a fingerprint of the data on the primary storage array. The method also includes using the received write IO to update track temporal write metadata for the track on the primary storage array, the track temporal write metadata containing an indication of a cumulative number of write operations that have occurred on the track on the primary storage array, using the received write IO to update track spatial write metadata for the track on the primary storage array, the track temporal write metadata containing an indication of a spatial distribution of the cumulative write operations that have occurred on the track on the primary storage array, and transmitting the write IO along with the updated track temporal write metadata and updated track spatial write metadata on a remote data replication facility to a backup storage array. The method also includes subsequently comparing the fingerprint of the data on the primary storage array, the track spatial write metadata on the primary storage array, and the track temporal write metadata on the primary storage array, with a corresponding fingerprint of the data on the backup storage array, track spatial write metadata on the backup storage array, and track temporal write metadata on the backup storage array, to determine the integrity of the data at the backup storage array.

In some embodiments, the method further includes compressing the data on the primary storage array, wherein creating the fingerprint of the data is implemented in connection with compressing the data. In some embodiments, the method further includes using the fingerprint of the data to implement deduplication of the data on the primary storage array.

In some embodiments, the track temporal write metadata is implemented using a set of track data version counters, each track data version counter being associated with a respective track, each track data version counter being incremented every time a write is implemented on the respective track.

In some embodiments, each track is divided into multiple sectors, and wherein the track spatial write metadata is implemented using a set of track sector signatures, each track data signature being associated with a respective track. In some embodiments, each respective track sector signature is implemented using a multi-bit register having respective subsets of bits of the multi-bit register allocated to each sector of the respective track, and wherein respective subset of bits of the multi-bit register for a given sector are incremented each time a write occurs that spatially encompasses writing to the given sector of the respective track.

In some embodiments, subsequently comparing the fingerprint of the data on the primary storage array, the track spatial write metadata on the primary storage array, and the track temporal write metadata on the primary storage array, with the corresponding fingerprint of the data on the backup storage array, the track spatial write metadata on the backup storage array, and the track temporal write metadata on the backup storage array includes generating a remote data integrity verification package at the primary storage array, the remote data integrity verification package including a set of track verification quartets, each track verification quartet including track identification information of a given track, track signature of the given track, track spatial write metadata of the given track, and track temporal write metadata of the given track, transmitting the remote data integrity verification package from the primary storage array to the remote storage array, receiving the remote data integrity verification package at the remote storage array, and implementing a comparison process at the remote storage array for each track verification quartet included in the remote data integrity verification package.

In some embodiments, subsequently comparing the fingerprint of the data on the primary storage array, the track spatial write metadata on the primary storage array, and the track temporal write metadata on the primary storage array, with the corresponding fingerprint of the data on the backup storage array, the track spatial write metadata on the backup storage array, and the track temporal write metadata on the backup storage array includes generating a remote data integrity verification package at the remote storage array, the remote data integrity verification package including a set of track verification quartets, each track verification quartet including track identification information of a given track, track signature of the given track, track spatial write metadata of the given track, and track temporal write metadata of the given track, transmitting the remote data integrity verification package from the remote storage array to the primary storage array, receiving the remote data integrity verification package at the primary storage array, and implementing a comparison process at the primary storage array for each track verification quartet included in the remote data integrity verification package.

In some embodiments, a system for selective packing of small block write operations prior to compression, includes one or more processors and one or more storage devices storing instructions that are operable, when executed by the one or more processors, to cause the one or more processors to perform operations including receiving a write IO operation by a primary storage array, the write IO containing data to be written to a portion of a track on the primary storage array, and creating a fingerprint of the data on the primary storage array. The operations further include using the received write IO to update track temporal write metadata for the track on the primary storage array, the track temporal write metadata containing an indication of a cumulative number of write operations that have occurred on the track on the primary storage array, using the received write IO to update track spatial write metadata for the track on the primary storage array, the track temporal write metadata containing an indication of a spatial distribution of the cumulative write operations that have occurred on the track on the primary storage array, and transmitting the write IO along with the updated track temporal write metadata and updated track spatial write metadata on a remote data replication facility to a backup storage array. The operations further include subsequently comparing the fingerprint of the data on the primary storage array, the track spatial write metadata on the primary storage array, and the track temporal write metadata on the primary storage array, with a corresponding fingerprint of the data on the backup storage array, track spatial write metadata on the backup storage array, and track temporal write metadata on the backup storage array, to determine the integrity of the data at the backup storage array.

In some embodiments, the operations further include compressing the data on the primary storage array, wherein creating the fingerprint of the data is implemented in connection with compressing the data. In some embodiments, the operations further include using the fingerprint of the data to implement deduplication of the data on the primary storage array.

In some embodiments, the track temporal write metadata is implemented using a set of track data version counters, each track data version counter being associated with a respective track, each track data version counter being incremented every time a write is implemented on the respective track.

In some embodiments, each track is divided into multiple sectors, and wherein the track spatial write metadata is implemented using a set of track sector signatures, each track data signature being associated with a respective track. In some embodiments, each respective track sector signature is implemented using a multi-bit register having respective subsets of bits of the multi-bit register allocated to each sector of the respective track, and wherein respective subset of bits of the multi-bit register for a given sector are incremented each time a write occurs that spatially encompasses writing to the given sector of the respective track.

In some embodiments, subsequently comparing the fingerprint of the data on the primary storage array, the track spatial write metadata on the primary storage array, and the track temporal write metadata on the primary storage array, with the corresponding fingerprint of the data on the backup storage array, the track spatial write metadata on the backup storage array, and the track temporal write metadata on the backup storage array includes generating a remote data integrity verification package at the primary storage array, the remote data integrity verification package including a set of track verification quartets, each track verification quartet including track identification information of a given track, track signature of the given track, track spatial write metadata of the given track, and track temporal write metadata of the given track, transmitting the remote data integrity verification package from the primary storage array to the remote storage array, receiving the remote data integrity verification package at the remote storage array, and implementing a comparison process at the remote storage array for each track verification quartet included in the remote data integrity verification package.

In some embodiments, subsequently comparing the fingerprint of the data on the primary storage array, the track spatial write metadata on the primary storage array, and the track temporal write metadata on the primary storage array, with the corresponding fingerprint of the data on the backup storage array, the track spatial write metadata on the backup storage array, and the track temporal write metadata on the backup storage array includes generating a remote data integrity verification package at the remote storage array, the remote data integrity verification package including a set of track verification quartets, each track verification quartet including track identification information of a given track, track signature of the given track, track spatial write metadata of the given track, and track temporal write metadata of the given track, transmitting the remote data integrity verification package from the remote storage array to the primary storage array, receiving the remote data integrity verification package at the primary storage array, and implementing a comparison process at the primary storage array for each track verification quartet included in the remote data integrity verification package.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
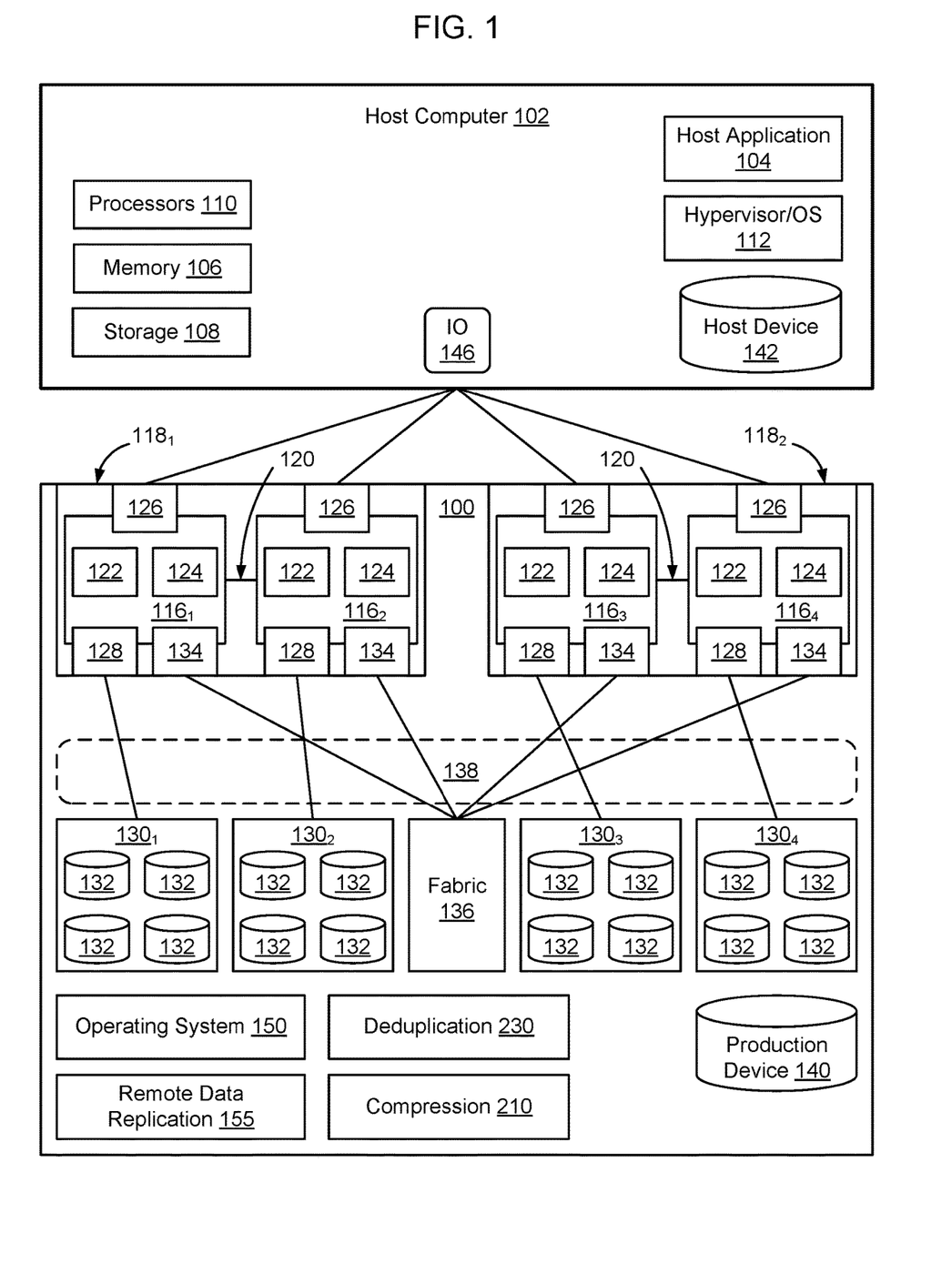
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible, then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

In some embodiments, the storage system 100 includes a remote data replication application 155 configured to enable the storage system 100 to participate in one or more remote data replication facilities 275 to enable data stored in storage resources 130 to be replicated to a backup storage system 100. It is possible for a primary storage array R1 to perform data replication to a backup storage array R2 where the storage systems 100 are compatible and properly configured.

The remote data replication application 155, when executed on storage system 100, enables the storage array 100 to participate in storage system level data replication between sets of mirroring pairs of storage systems 100. A set of storage arrays 100 that are configured for data to be mirrored from a primary storage array R1 to a backup storage array R2 will be referred to herein as a "Remote Data Replication Facility" 275. A given storage system, such as storage system 100, may operate as a primary storage array R1 or backup storage array R2 in many mirroring pairs, and hence multiple remote data replication applications 155 may simultaneously execute on storage system 100 to control participation of the storage system 100 in the mirroring operations of multiple remote data replication facilities 275.

In some embodiments, the remote data replication application 155 is configured to cause subsets of data stored within storage resources 132 of storage array 130 to be mirrored in real time (as I/Os occur) by the storage system 100 to one or more similar backup storage system 100. One example remote data replication technology is used by Dell™ and referred to as Symmetrix Remote Data Facility, also referred to as SRDF or RDF. However, the embodiments described herein are not limited to implementations that uses SRDF as the remote data replication technology, as other synchronous or asynchronous remote data replication technologies may be used as well.

When remote data replication is used to protect data on the primary storage array R1, it is important to confirm that the data on the backup storage array R2 is identical to the data on the primary storage array R1. In some embodiments, a remote data comparison process is used to check for data mismatches between the production volume on the primary storage array R1 and the replication volume on the backup storage array R2.

Conventionally, to compare the remote and primary versions of a track of data, the remote data comparison process would read the track from storage resources on the primary storage array R1. The remote data comparison process would then generate a MD5 hash from the data on the primary storage array R1, and send the track ID and MD5 hash to the backup storage array R2. When the backup storage array R2 receives the track ID and the primary storage array R1-MD5 hash, the backup storage array R2 would read its copy of the data, generate an MD5 hash (R2-MD5 hash), and compare the primary storage array R1-MD5 hash with the backup storage array R2-MD5 hash. If the two are the same, a determination is made that the data is the same. If the two hashes are different, there is a possibility that the data on the backup storage array R2 is not the same as the data on the primary storage array R1. This is a costly process, because the data needs to be read on both R1 and R2, MD5-hashes need to be created on both R1 and R2, and then the hashes need to be compared, all of which consumes CPU, memory, and disk bandwidth resources.

According to some embodiments, when data is received at the primary storage array R1, a compression process at the primary storage array R1 performs in-line compression at the track level or quarter track level. As part of this compression process, a fingerprint is generated that is used on the primary storage array R1 to implement deduplication. Deduplication, as that term is used herein, is used to refer to a process that checks to see whether a given piece of data is a duplicate of another piece of data that is already stored in the storage system.

When data is received at the primary storage array R1, in addition to creation of the fingerprint, the primary storage array also creates spatial and temporal write metadata for the track, identifying how many times write IO operations have occurred on a particular track (track temporal write metadata) and which sectors of the track have been written to over time (track spatial write metadata). The data is then transmitted to the backup storage array R2 on the remote data replication facility 275. According to some embodiments, the track temporal write metadata and track spatial write metadata are also sent from the primary storage array R1 to the backup storage array R2 on the remote data replication facility.

To implement remote data verification of a particular track on the remote data replication facility 275, the track fingerprint as well as track temporal write metadata and track spatial write metadata are sent along from the primary storage array R1 to the backup storage array R2. The backup storage array R2 retrieves a locally stored track fingerprint for the track as well as local (R2) track temporal write metadata and local (R2) track spatial write metadata. The backup storage array R2 then compares the two track fingerprints (R1 track fingerprint and R2 track fingerprint), compares the two copies of the track temporal write metadata (R1 track temporal write metadata and R2 track temporal write metadata), and compares the two copies of the track spatial write metadata (R1 track spatial write metadata and R2 track spatial write metadata).

In response to a determination that the fingerprints, track temporal write metadata, and track spatial write metadata, are all the same on both the primary storage array R1 and the backup storage array R2, the comparison process determines that the data of the track is the same on both storage arrays. In response to a determination that one or more of the fingerprints, the track temporal write metadata, or the track spatial write metadata, are not the same on both the primary storage array R1 and the backup storage array R2, the comparison process determines that it is possible that the data is not the same on both storage arrays. Of particular importance, it is possible to implement the process of remote data verification without reading the data on either the primary storage array R1 or on the backup storage array R2. Further, remote data verification is able to be implemented simply by comparing pieces of data that previously existed, such that no new hash values need to be created to implement remote data verification. This enables the remote data verification process to be implemented using significantly less CPU resources.

Figure 2:
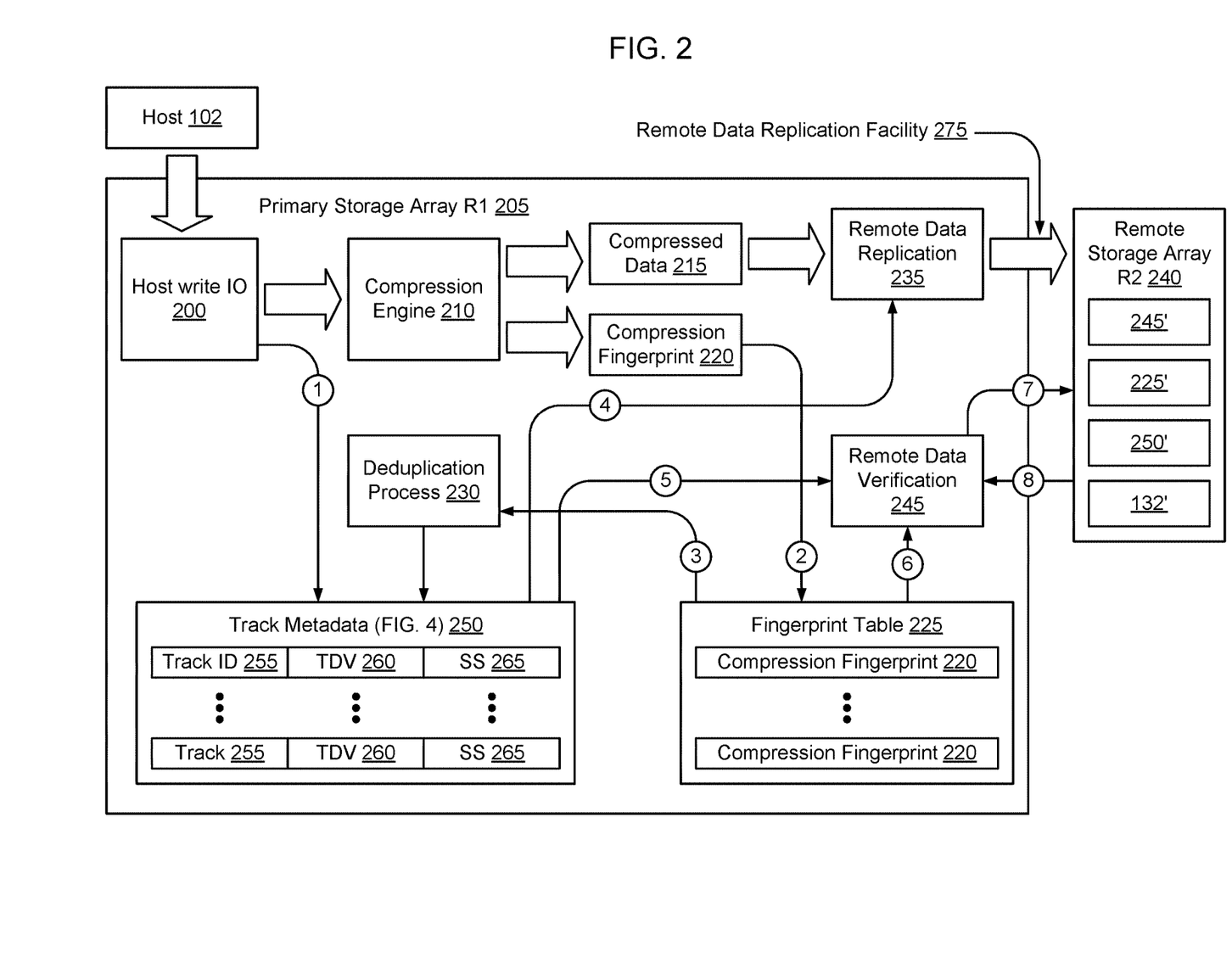
FIG. 2 is a block diagram of a primary storage array R1 and a backup storage array R2 implementing a remote data replication facility, and showing components of the primary storage array R1 involved in remote data integrity verification on the remote data replication facility in greater detail, according to some embodiments.

FIG. 2 is a block diagram of a remote data replication facility 275 including a primary storage array R1 and a backup storage array R2, on which data of one or more logical devices is replicated from the R1 to the R2 storage array, according to some embodiments. An example logical device, for example, might be production device 140. Each logical device includes a plurality of extents. Extents, in some embodiments, are fixed size allocations of storage. An example extent size might be, for example, 128 Kb although the particular size of the extent will depend on the particular implementation. Data of the extents is stored on tracks of storage provided by the managed storage resources 132, such that each extent has a large number of tracks. Write IO operations by the host 102 occur on particular tracks or on portions of tracks. For example, a given write IO operation might occur on a portion of a track, on an entire track, on a set of tracks of a given extent, or on a set of tracks that are contained in multiple extents of a given device.

When a write operation is received on the primary storage array R1, the write operation is mirrored using the remote data replication application 155 to the backup storage array R2. Data transfer among storage systems 100, including transfers between storage arrays for data replication (mirroring) functions, may take place in several ways depending on how the primary storage array R1 handles data written by the host 102 and how the backup storage array R2 acknowledges receipt of data on the remote data replication facility 275. Two example data mirroring modes will be referred to herein as synchronous and asynchronous. Where data transfers occur between storage arrays 100, data transfer can take place over a communication network connecting the storage arrays 100, such as a Fibre Channel network or an Internet Protocol network.

In synchronous remote data replication mode, to maintain a synchronous relationship between the primary storage array R1 and the backup storage array R2, each IO from a host 102 is forwarded by the primary storage array R1 to the backup storage array R2 as it is received from host 102, and the primary storage array R1 will wait for an acknowledgment from the backup storage array R2 before the primary storage array R1 acknowledges the write IO to the host 102.

In an asynchronous remote data replication mode, when data is received from a host 102, the data is written to the primary storage array R1 and a data transfer process is initiated to write the data to the backup storage array R2 on the remote data replication facility 275. The primary storage array R1 acknowledges the write operation to the host 102 before the primary storage array R1 has received an acknowledgement that the data has been received by the backup storage array R2. The use of asynchronous data replication enables the data on the primary storage array R1 and backup storage array R2 to be one or more cycles out of synchronization, because the primary storage array R1 will continue to execute IOs prior to receipt of acknowledgments from the backup storage array R2. The use of asynchronous replication may be beneficial in connection with sites located geographically distant from each other, for example where the distance between the primary storage array R1 and the backup storage array R2 is such that waiting for an acknowledgement from the backup storage array R2 would take considerable time and, hence, reduce responsiveness of the primary storage array R1 to the host 102.

In some embodiments, as described in greater detail herein, once the data has been replicated from the primary storage array R1 to the backup storage array R2, a background process is implemented on the primary storage array R1 to verify that the data on the backup storage array R2 is the same as the data on the primary storage array R1. This background process is referred to herein as a remote data verification process 245.

In some embodiments, to reduce the amount of bandwidth required to implement the remote data replication facility 275, a compression engine 165 is used to compress the data prior to transmitting data from the primary storage array R1 to the backup storage array R2. As part of the compression process, in some embodiments the compression engine 165 also creates a fingerprint from the data that is used by a deduplication process 230 to determine whether the storage system already has stored a copy of the same data in backend storage resources.

There are instances where a given piece of data might be transmitted to the storage system multiple times. Rather than storing multiple copies of the same piece of data, in some embodiments a deduplication process 230 on the storage system will identify copies of the same data, store one copy, and use metadata pointing to the location of the data for each of the duplicate copies. This enables the overall consumption of backend storage resources to be reduced. In some embodiments, in instances where deduplication is being implemented on the primary storage array R1, the deduplication process 230 will use the fingerprint from the compression engine 165 and implement a lookup on a fingerprint table to determine if the same fingerprint exists in the fingerprint table for another piece of data. In the event that the fingerprint of the newly received piece of data matches a previous fingerprint, it is possible that the new data is a duplicate of previously received data. By only storing one copy of the same data, it is possible to reduce the amount of data maintained in backend storage resources 130.

In some embodiments, the fingerprints that are generated from the data by the compression engine 165 are unlikely to be the same for different data. However, it is possible that there might be a collision, where two different pieces of data have the same fingerprint, and hence using the fingerprint alone is not adequate to ensure that the backup storage array R2 has the same copy of data as the primary storage array R1.

According to some embodiments, other characteristics of the track are used in connection with the fingerprint of the data stored at the track. In some embodiments, the other characteristics include track spatial write metadata and track temporal write metadata. For example, in some embodiments each time a write IO occurs on a particular track, a counter referred to herein as a "Track Data Version" (TDV) is incremented by 1. The TDV for a given track starts at 0 the first time a write occurs on that track, and is a monotonically increasing number. An example TDV might be 16-bit value, but other length counters may be used as well. The value of the TDV for a given track identifies the number of times the track has been written on the corresponding storage system and, accordingly, provides track temporal write metadata for the track. A given write might be only on a very small portion of the track, but every write on the track causes the corresponding TDV for the track to be incremented.

Depending on the manner in which the remote data replication facility 275 is implemented, a number of write IO operations may occur on a given track before the track is forwarded to the backup storage array R2. For example, in asynchronous remote data replication, the primary storage array R1 and backup storage array R2 may be a number of write operations out of synchronization. Where multiple write IO operations occur on a given track on the primary storage array R1, these write IO operations might be consolidated prior to transmission of the new track data to the backup storage array R2. Hence, in some embodiments having the backup storage array R2 maintain independent track temporal write metadata for the track might cause the primary storage array R1 and the backup storage array R2 to have different track temporal write metadata. According to some embodiments, when a track is sent from the primary storage array R1 to the backup storage array R2 on the remote data replication facility 275, the current TDV of the track will be sent by the primary storage array R1 along with the write IO from the primary storage array R1 to the backup storage array R2 and stored by the backup storage array R2 as part of the metadata for the track.

A track has a fixed size (128 KB in some embodiments), and each track is spatially divided into a number of sectors (16 in some embodiments). To capture spatial distribution of write IOs within the track, in some embodiments a sector signature is created which, in some embodiments, has 32 bits-2 bits per sector. In some embodiments, the sector signature is implemented as a concatenation of these 16 two-bit sector values. Each time a write occurs on a particular sector, the 2-bit sector value is incremented by 1. The 2-bit value hence has the values of 0, 1, 2, 3, and then resets back to 0 using the following repetitive sequence:

00(0)→01(1)→10(2)→11(3)→00(0)→01(1)→10(2)→..

As noted above, in some embodiments multiple writes might be consolidated on the primary storage array R1 prior to being transmitted to the backup storage array R2. Accordingly, independent creation of a sector signature on the backup storage array R2 could cause the backup storage array R2 to generate inconsistent track spatial write metadata as well as inconsistent track temporal write metadata. According to some embodiments, when a track is transmitted from the primary storage array R1 to the backup storage array R2, the sector signature is transmitted by the primary storage array R1 along with the write IO to the backup storage array R2 and stored by the by the backup storage array R2 as part of the metadata for the track.

In some embodiments, to implement remote data integrity verification, the primary storage array R1 selects a group of tracks and collects the track fingerprints, track temporal write metadata such as the track data version for each selected track, and the track spatial write metadata such as the track sector signature for each selected track. The number of tracks that get packaged together and sent from the primary storage array R1 to backup storage array R2 may vary depending on the embodiment. As used herein, the term "track verification quartet" will be used to refer to combination of (1) track identification information; (2) track fingerprint; (3) track temporal write metadata; and (4) track spatial write metadata.

Figure 5:
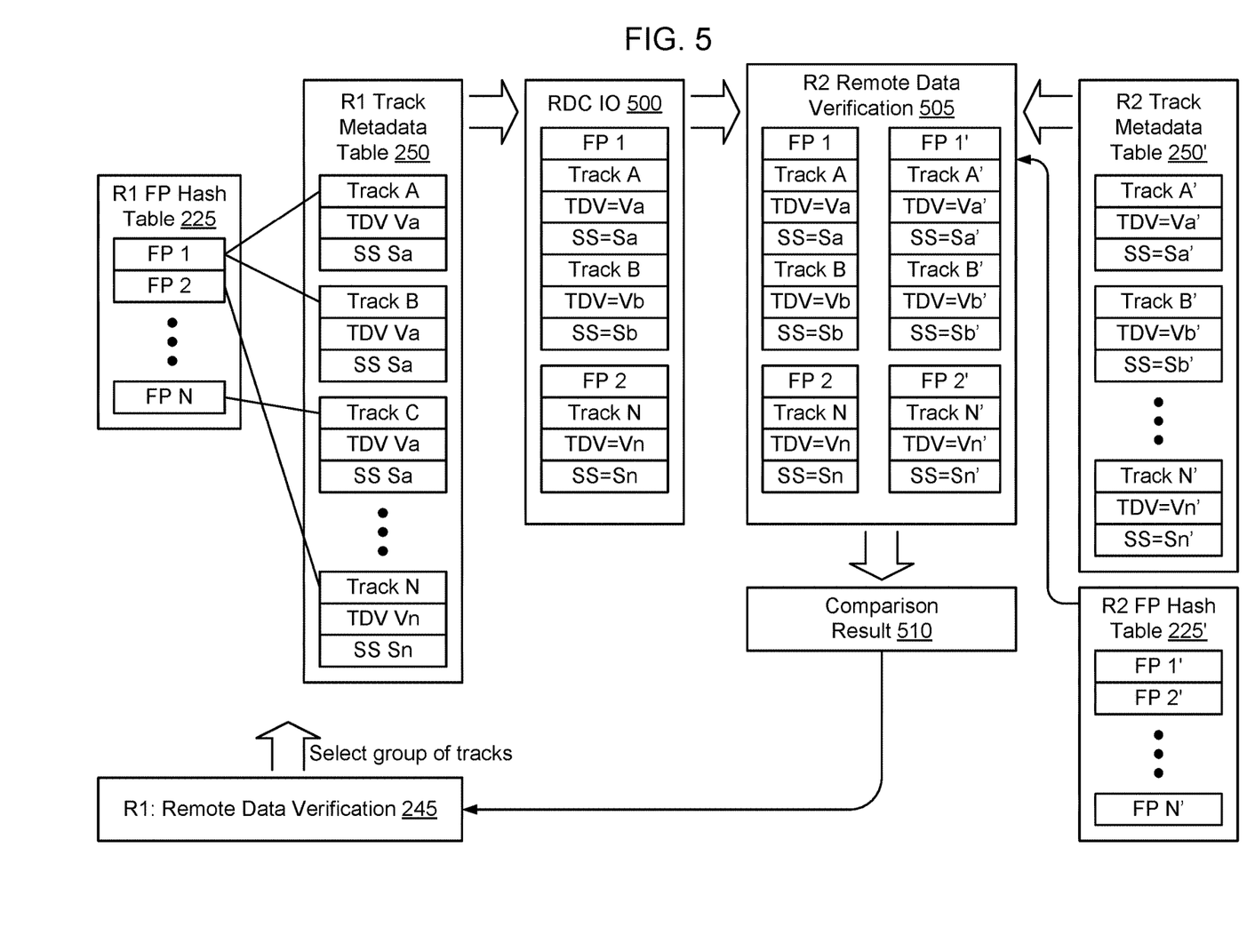
FIG. 5 is a block diagram graphically illustrating a process of remote data integrity verification on a remote data replication facility, according to some embodiments.

When the backup storage array R2 receives a remote data integrity verification package 500 containing a set of one or more track verification quartets, it creates corresponding track verification quartets from its locally stored fingerprint tables and track metadata tables, and compares the locally created track verification quartets with the track verification quartets received from the primary storage array R1. If there is any difference between a locally created track verification quartet and the track verification quartet received in the remote data integrity verification package 500, a possible data mismatch is identified by the backup storage array R2. The result of the comparison is forwarded from the backup storage array R2 to the remote data verification process 245 on the primary storage array R1.

FIG. 2 is a block diagram of a primary storage array R1 and a backup storage array R2 implementing a remote data replication facility 275, and showing components of the primary storage array R1 involved in remote data integrity verification on the remote data replication facility 275 in greater detail, according to some embodiments.

As shown in FIG. 2, in some embodiments host 102 sends a write IO 200 to the primary storage array R1. Each time a host write IO 200 is received on a particular track or a portion of a track, track metadata for the respective track is updated and stored in track metadata tables 250 (arrow 1). In some embodiments, the track metadata includes track identification information 255, track temporal write metadata 260, and track spatial write metadata 265. Example track temporal write metadata 260 might be implemented using a track data version (TDV) data structure, although other constructs might also be used to maintain track temporal write metadata 260 depending on the implementation. Example track spatial write metadata 265 might be implemented using a track sector signature (SS) data structure, although other constructs might also be used to maintain track spatial write metadata depending on the implementation.

The host write IO 200 is sent to a compression engine 210 which generates compressed data 215. Compression engine 210 might compress data at the track level or at another granularity such as at the quarter track level, depending on the implementation. For example, in some embodiments the tracks have a size of 128 KB and the compression engine 210 compresses data using a granularity of 32 KB (quarter track size). In addition to generating compressed data 215, the compression engine 210 generates a compression fingerprint 220 that is stored in the fingerprint table 225 (arrow 2) that is used by the deduplication process 230 (arrow 3) to implement deduplication on the storage system 100.

In some embodiments, the compressed data 215 and the updated track metadata (arrow 4) are provided to the remote data replication process 235. The remote data replication process 235 transmits the track identification information, compressed data, and track metadata (track temporal write metadata 260 and track spatial write metadata 265) on the remote data replication facility 275 to the backup storage array R2 240. The backup storage array R2 240 uses the compressed data to update its version of the data stored in back-end storage resources 132', uses a compression process to create a fingerprint of the received data that is stored in a remote array fingerprint table 225', and stores the track metadata in a remote array track metadata table 250'. In connection with creation of a fingerprint, it is assumed that the backup storage array R2 is using the same compression algorithm as the primary storage array R1 and, accordingly, that both storage arrays will create the same fingerprint when presented with the same data.

It is possible for the backup storage array R2 to miss a write operation or a portion of a write operation transmitted on the remote data replication facility 275. Accordingly, as shown in FIG. 2, in some embodiments a remote data verification process 245 is used to verify the data contained on the backup storage array R2. In some embodiments, the remote data verification process 245 generates a track verification quartet including a combination of track identification information 255, track temporal write metadata 260, and track spatial write metadata 265 (arrow 5), and track fingerprint 220, (arrow 6). The track verification quartet is sent to the backup storage array R2 (arrow 7). The backup storage array R2 implements a comparison between the information received in the track verification quartet and local versions of the corresponding data, and sends a comparison response to the remote data verification process 245 on the primary storage array R1 (arrow 8). Although FIG. 2 shows some embodiments in which the track verification quartet is sent from the primary storage array R1 to the backup storage array R2, and a comparison is implemented on the backup storage array R2, it should be understood that the reverse process may also be implemented. Specifically, in some embodiments a track verification quartet is created on the backup storage array R2 and sent to the primary storage array, and upon receipt of the track verification quartet the remote data verification system 245 on the primary storage array R1 implements a comparison between the information received in the track verification quartet and local versions of the corresponding data.

Figure 3:
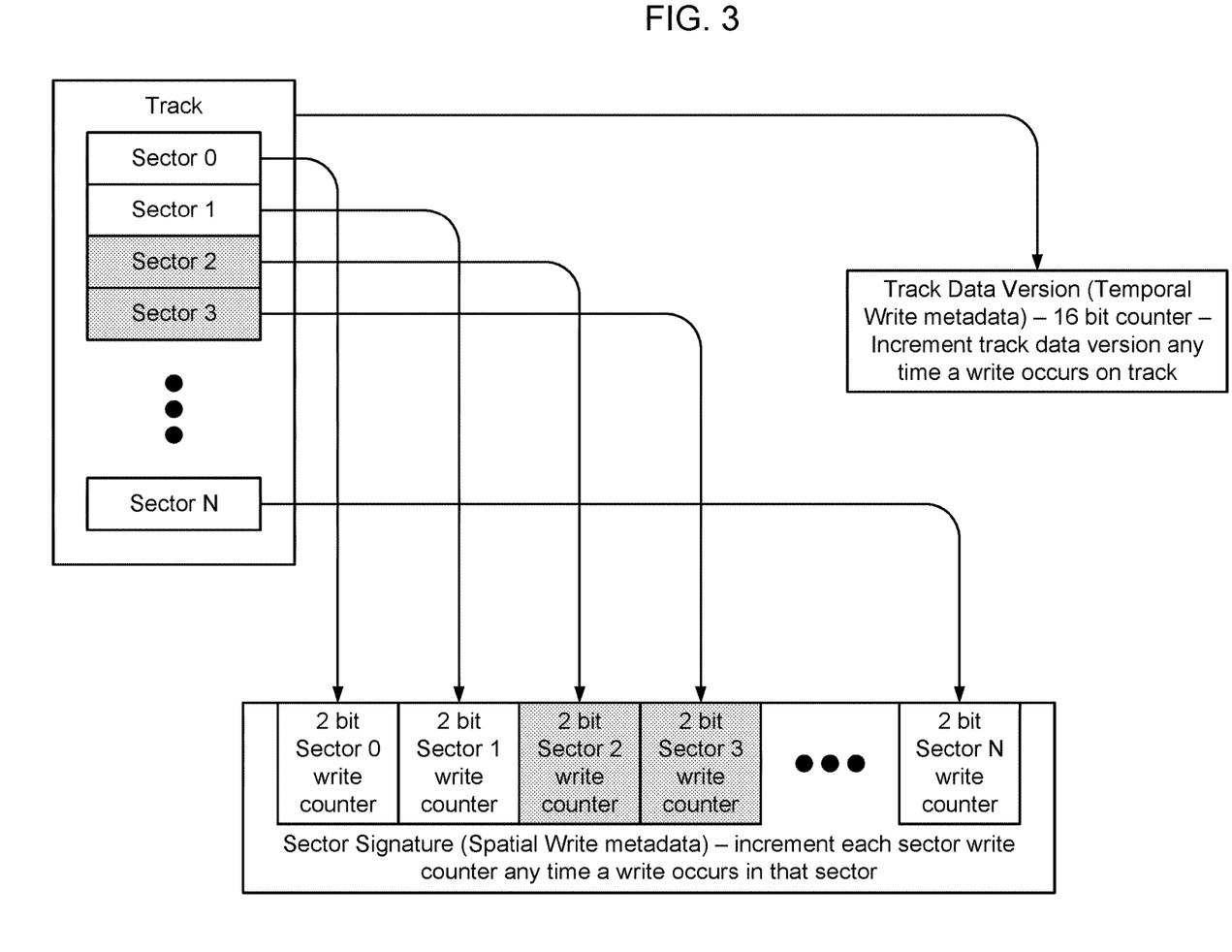
FIG. 3 is a block diagram showing an example method of creating spatial and temporal write metadata for use in connection with implementing remote data integrity verification on a remote data replication facility, according to some embodiments.

FIG. 3 is a block diagram showing an example method of creating track spatial write metadata 265 and track temporal write metadata 260 for use in connection with implementing remote data integrity verification on a remote data replication facility 275, according to some embodiments. As shown in FIG. 3, in some embodiments the track temporal write metadata 260 is implemented by counting a number of write operations on a particular track. For example, in some embodiments a track data version implemented as a counter is used to keep track of the number of write IO operations on a track or portion of a track. For example, a 16-bit counter having values of between 0-65535 may be used to keep track of the number of write IO operations that are implemented by the primary storage array R1 on a given track, although it should be understood that counters of different lengths may be used depending on the implementation. A separate track data version is used to maintain track temporal write metadata 260 for each respective track on the primary storage array R1. A given track data version is incremented by one each time a write IO occurs on the respective track associated with the given track data version. Since write IOs occur over time on a given track, the track data version for the track contains temporal information about the number of writes that have previously taken place on the track over time. If the backup track data version for a given track is different on the backup storage array R2 than on the primary storage array R1, it is possible that the backup storage array R2 missed one or more write operations on the track and, accordingly, the data contained in the track on the backup storage array might be different than the data contained in the track on the primary storage array R1.

As shown in FIG. 3, in some embodiments the track spatial write metadata 265 is implemented by counting a number of write operations on each sector of a particular track. In some embodiments, tracks are divided into a number of sectors to enable read and write operations to be implemented on portions of tracks. Some examples will be described herein in which each track is divided into 16 sectors, although it should be understood that different numbers of sectors may be utilized per track depending on the particular implementation. If the sector signature for a given track is different on the backup storage array R2 than on the primary storage array R1, it is possible that only a portion of a write operation was implemented on the backup storage array R2 and, accordingly, the data contained in the track on the backup storage array might be different than the data contained in the track on the primary storage array R1.

As shown in FIG. 3, in some embodiments, each time a write IO is received on a track, any sectors that are included in the write IO are identified and corresponding write counter for the respective sectors are incremented. For example, in FIG. 3 it is assumed that a write IO has been received that requires data to be written to portions of sectors 2 and 3. Accordingly, the corresponding two-bit write counter for sector 2 and corresponding two-bit write counter for sector 3 have both been incremented. Although some embodiments are described in which the write counters are two-bits in length, such that the track spatial write metadata 265 is implemented as a sector signature having a length of 32 bits, it should be understood that the particular length of the write counters may vary depending on the particular implementation.

Figure 4:
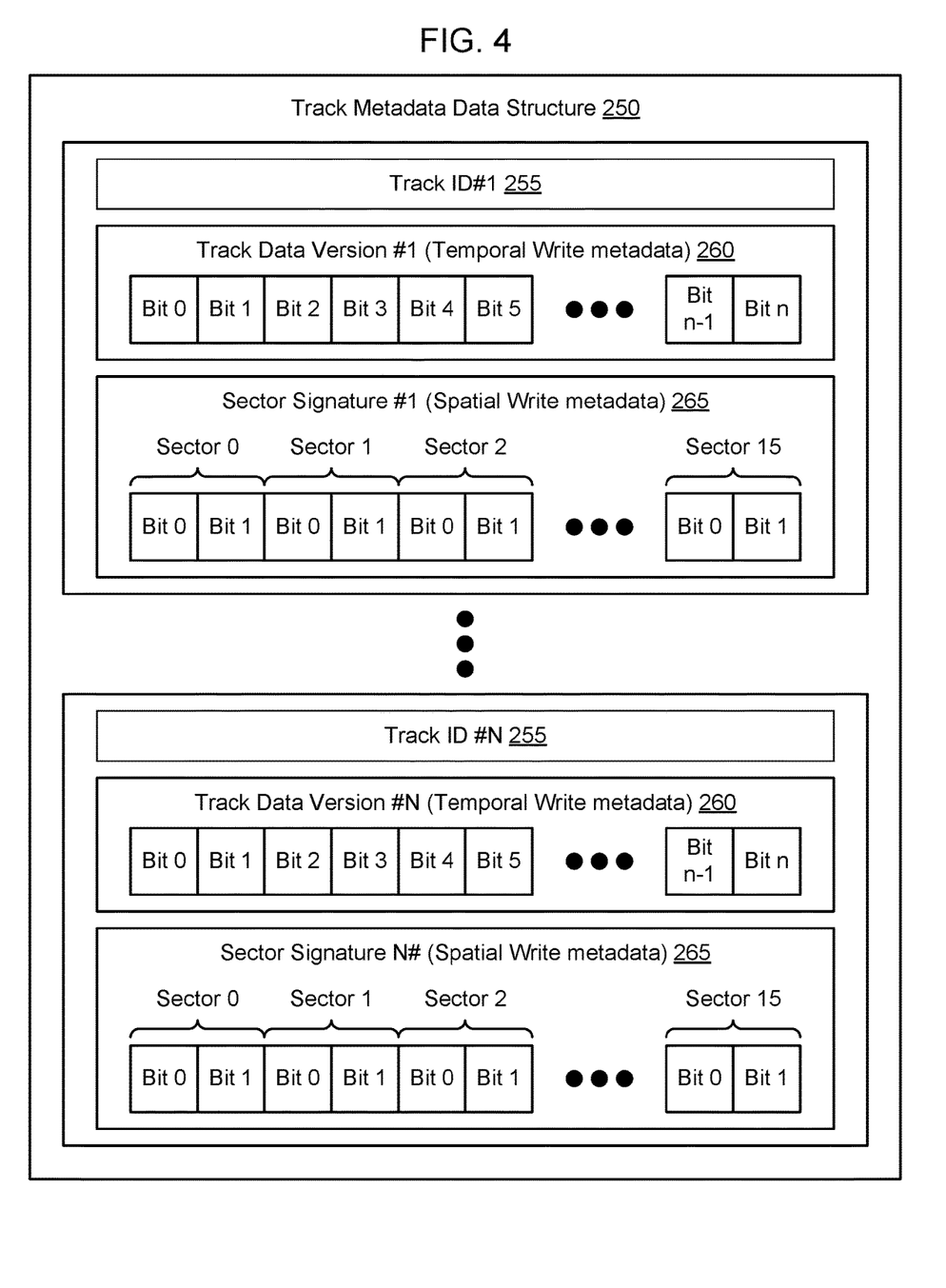
FIG. 4 is a block diagram of an example track metadata data structure correlating track identification information with track spatial write metadata and track temporal write metadata, according to some embodiments.

FIG. 4 is a block diagram of an example track metadata data structure 250 correlating track identification information with track spatial write metadata 265 and track temporal write metadata 260, according to some embodiments. Although FIG. 4 shows an example data structure implemented as a table for ease of illustration, it should be understood that many other types of data structures may be used to implement track metadata data structure 250. As shown in FIG. 4, in some embodiments one or more track metadata data structures 250 is used to store entries containing track metadata for each track of data stored in the primary storage array R1 that is replicated on the remote data replication facility 275. The track metadata data structure 250 shown in FIG. 4 contains entries for tracks 1-N. In connection with track #1, the entry includes identifying information for track #1, such as the track ID value and a pointer to the corresponding fingerprint in the fingerprint table 225. In instances where the deduplication system has determined that there are multiple copies of the same data stored on the storage system, multiple track IDs might point to the same fingerprint in the fingerprint table 225. The entry for track #1 also includes the track temporal write metadata 260 which, in this example, is implemented as a multiple bit counter-Track Data Version #1. The metadata entry for track #1 also includes track spatial write metadata 265 for the track which, in this example, is implemented as a multiple bit sector signature #1, with each region of the sector signature corresponding to a particular sector of the track.

FIG. 5 is a block diagram graphically illustrating a process of remote data integrity verification on a remote data replication facility 275, according to some embodiments. As shown in FIG. 5, when a determination is made to implement remote data verification for a select track or a select plurality of tracks, a track verification package 500 is created including a corresponding track verification quartet for each selected track. As used herein, the term "track verification quartet" is used to refer to a combination of track identification information 255, track fingerprint 220, track temporal write metadata 260, and track spatial write metadata 265, for a given track.

For example, in FIG. 5 a determination has been made to implement integrity verification for tracks A, B, and N, which are associated with fingerprint 1 and fingerprint 2. Accordingly, a first track verification quartet is created that includes fingerprint 1, track identification information for track A, and track temporal write metadata 260 and track spatial write metadata 265 for track A (TDV=Va and SS=Sa). A second track verification quartet is created that includes fingerprint 1, track identification information for track B, and track temporal write metadata 260 and track spatial write metadata 265 for track B (TDV=Vb and SS=Sb). A third track verification quartet is also created that includes fingerprint 2, track identification information for track N, and track temporal write metadata 260 and track spatial write metadata 265 for track N (TDV=Vn and SS=Sn). It should be noted, in FIG. 5, that fingerprint 1 is associated with both tracks A and B. Accordingly, FIG. 5 shows an optimization in which the track verification package 500 includes only one copy of fingerprint 1 to reduce the size of the track verification package 500 for transmission to backup storage array R2. The single copy of fingerprint 1 is associated with and forms a part of the respective track verification quartet for each of the tracks A and B.

When the backup storage array R2 receives the track verification package 500, it creates corresponding track verification quartets from its local track metadata table 250' and fingerprint table 225'. Specifically, for each track in the track verification package 500, the remote data verification process 245 on the backup storage array R2 retrieves corresponding track identification information, track temporal write metadata 260 and track spatial write metadata 265 from the track metadata table 250'.

In this example, the remote data verification process 245 on the backup storage array R2 creates a track verification quartet using corresponding track identification information for track A', and track temporal write metadata 260 and track spatial write metadata 265 for track A' (TDV=Va' and SS=Sa'), and fingerprint for track A' FP1'. A second track verification quartet is created that includes fingerprint 1', track identification information for track B', and track temporal write metadata 260 and track spatial write metadata 265 for track B' (TDV=Vb' and SS=Sb'). A third track verification quartet is also created that includes fingerprint 2', track identification information for track N', and track temporal write metadata 260 and track spatial write metadata 265 for track N' (TDV=Vn' and SS=Sn'). It should be noted, in FIG. 5, that fingerprint 1' is associated with both tracks A' and B'. Accordingly, FIG. 5 shows an optimization in which the track verification package 500 created by the remote data verification process 245 on the backup storage array R2 includes only one copy of fingerprint 1'. The single copy of fingerprint 1' is associated with and forms a part of the respective track verification quartet for each of the tracks A' and B'.

The remote data verification process 245 on the backup storage array R2 then compares each track verification quartet by using the track identification information to identify the track and corresponding fingerprint, and then compares the track fingerprint (FP1 is compared with FP1'), compares the track temporal write metadata 260 (TDV=Va is compared with TDV=Va'), and compares the track spatial write metadata 265 (SS=Sa is compared with SS=Sa'). If any change is detected between the tuple (FP,TDV,SS) provided by the primary storage array R1 and the tuple (FP',TDV',SS') provided by the backup storage array R2 for a given track ID, a determination is made that the data on the backup storage array R2 might not be the same as the data contained on the primary storage array R1. In response to a determination that the data on the backup storage array might not be the same as the data on the primary storage array R1, the primary storage array R1 is notified to enable the data on the backup storage array R2 to be corrected to match the data contained on the primary storage array R1.

Figure 6:
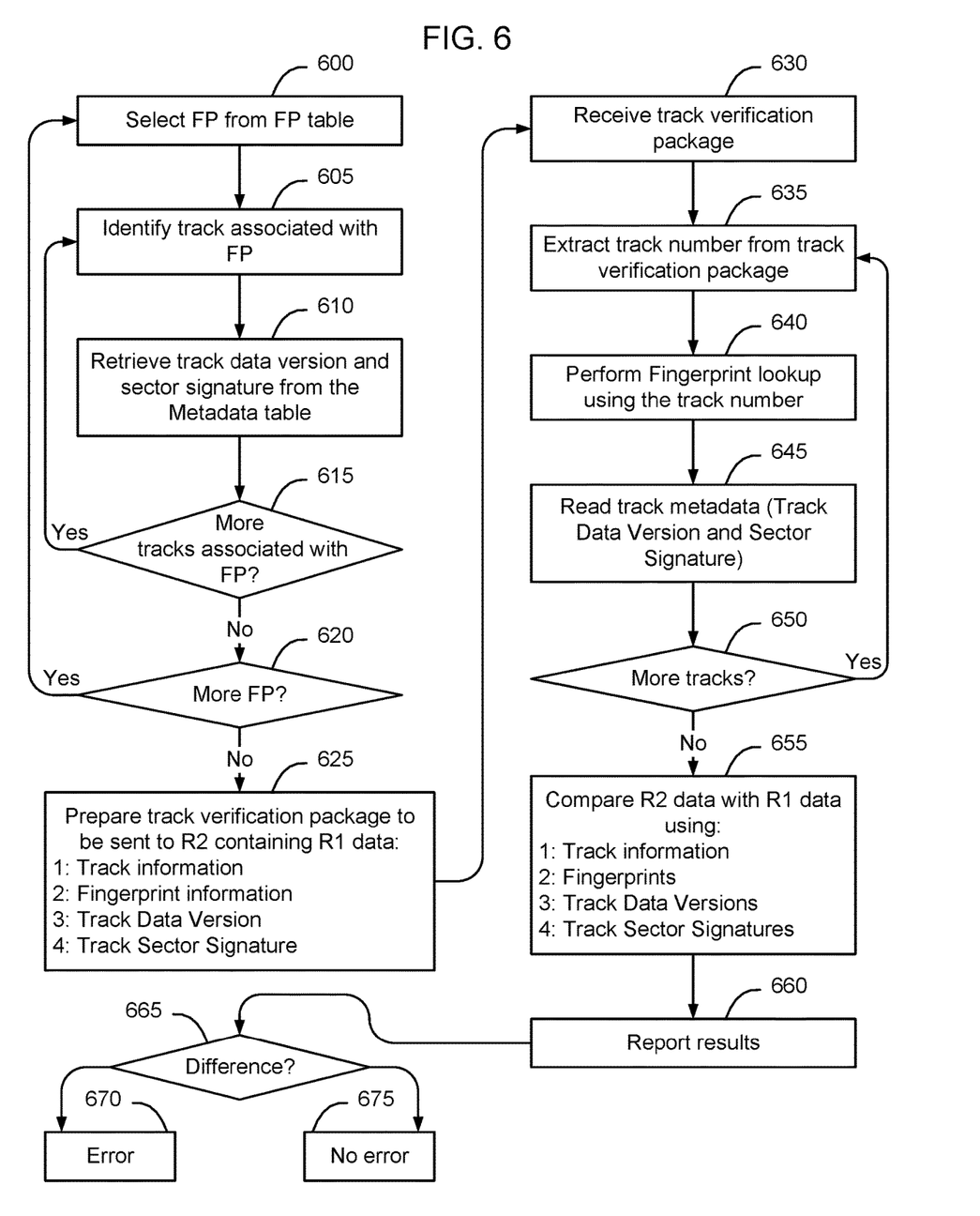
FIG. 6 is a flow chart of an example method of remote data integrity verification on a remote data replication facility, according to some embodiments.

FIG. 6 is a flow chart of an example method of remote data integrity verification on a remote data replication facility 275, according to some embodiments. In the example shown in FIG. 6, tracks are selected for inclusion in a track verification package 500 for remote data verification by selecting a fingerprint from the fingerprint table 225, and then retrieving track identification information and associated metadata for each track that is associated with the selected fingerprint. It should be understood that there are other ways for selecting tracks to be included in the track verification package 500 depending on the particular implementation.

As shown in FIG. 6, in some embodiments a given fingerprint is selected from the fingerprint table 225 (block 600) and a track associated with the selected fingerprint is then identified (block 605). The track identification information of the track, track temporal write metadata 260 such as a track data version, and track spatial write metadata 265 such as a sector signature are then retrieved from the track metadata table 250 and added to the track verification package 500 (block 610).

A determination is then made if there are more tracks associated with the selected fingerprint (block 615). In response to a determination that there are more tracks associated with the selected fingerprint (a determination of YES at block 615), the process returns to block 605 where a subsequent track associated with the selected fingerprint is selected and metadata associated with the subsequent track is retrieved (block 610). The process of blocks 605-615 iterates until all tracks associated with the selected fingerprint have been processed and the track ID information and corresponding metadata has been added to the track verification package 500 (a determination of NO at block 615).

A determination is then made as to whether additional fingerprints should be selected for inclusion in the track verification package 500 (block 620). In response to a determination that additional fingerprints should be used to identify corresponding tracks for inclusion in the track verification package 500 (a determination of YES at block 620) the process returns to block 600 and the process described in connection with blocks 605-620 iterates until creation of the track verification package 500 has completed (a determination of NO at block 620).

The remote data verification process 245 then completes creation of the track verification package 500, and the track verification package 500 is sent on the remote data replication facility 275 to the backup storage array R2 (block 625). As shown in FIG. 6, in some embodiments the track verification package 500 includes a set of one or more track verification quartets, in which each track verification quartet includes the combination of (1) track identification information; (2) track fingerprint; (3) track temporal write metadata 260 such as the track data version; and (4) track spatial write metadata 265 such as the track sector signature.

When the backup storage array R2 receives the track verification package 500 (block 630), the remote data verification process 245' on the backup storage array R2 extracts the track number from the track verification package 500 (block 635) and performs a fingerprint lookup using the track identification information 255 in the local fingerprint table 225' (block 640). The remote data verification process 245' on the backup storage array R2 also retrieves corresponding track temporal write metadata 260' and track spatial write metadata 265' such as the track data version and the sector signature for the track from the track metadata table 250' (block 645).

A determination is then made if the track verification package 500 includes more tracks (block 650). In response to a determination that the track verification package 500 includes additional tracks (a determination of YES at block 650), the process returns to block 635 where a subsequent track is selected. The process described in connection with blocks 635-650 iterates until all tracks of the track verification package 500 have been selected (a determination of NO at block 650).

The remote data verification process 245' then implements a comparison between the data contained in the track verification package 500 and the data retrieved from local fingerprint table 225' and from local metadata table 250' (block 655). The results of the comparison are then reported back to the remote data verification process 245 on the primary storage array R1 (block 660), and the remote data verification process 245 on the primary storage array R1 evaluates the results for each track contained in the track verification package 500 (block 665).

In some embodiments, for each track in the track verification package 500, the comparison (block 655) compares the tuple (Track Fingerprint=FP, track temporal write metadata=TDV, track spatial write metadata=SS) provided by the primary storage array R1 with the corresponding tuple (FP', TDV', SS') provided by the backup storage array R2. In some embodiments, the results (block 660) identify any mismatch between the tuple (FP, TDV, SS) and (FP', TDV', SS') for a given track.

In response to a determination that there is no difference between a corresponding pair of tuples (a determination of NO at block 665) no error is reported (block 675). In response to a determination that the results indicate that there was a difference between a corresponding pair of tuples for a given track (a determination of YES at block 665) an error is reported (block 670). Notably, an error may be reported if the results indicate that there was a difference in any portion of the corresponding tuples. For example, an indication in the results (block 660) that there was a difference between fingerprints for a given track (FP1 #FP1') will result in a determination of a difference at block 665 (a determination of YES at block 665), which will result in generation of an error (block 670). Similarly, an indication in the results (block 660) that there was a difference between track temporal write metadata 260 instances for a given track (TDV1≠TDV1') will result in a determination of a difference at block 665 (a determination of YES at block 665), which will result in generation of an error (block 670). Additionally, an indication in the results (block 660) that there was a difference between track spatial write metadata 265 instances for a given track (SS1≠SS1') will result in a determination of a difference at block 665 (a determination of YES at block 665), which will result in generation of an error (block 670).

By implementing remote data verification using track fingerprints, which are automatically created during compression, it is possible to implement remote data verification on a given track without reading the data of the track at either the primary storage array R1 or the backup storage array R2. This significantly reduces the amount of disk access resources required to implement remote data verification, as well as reduces CPU resources that otherwise would need to be used to create a hash from the retrieved data. By incorporating track temporal write metadata 260 and track spatial write metadata 265 into the remote data verification process 245, it is possible to ensure that data collisions don't occur thus enabling the data stored on the backup storage array R2 to be verified with a zero percent hash collision possibility. Further, in instances where a given fingerprint is deduplicated to multiple tracks, it is possible to implement remote data verification as a group, thus enabling remote data integrity verification to be implemented in bulk and hence accelerating data integrity verification on a remote data replication facility.

Although some embodiments have been described in which the track verification package 500 is initially created at the primary storage array R1 and transmitted to the backup storage array R2, and in which the data comparison is implemented on the backup storage array R2, it should be understood that these roles may be reversed. Specifically, in some embodiments, the track verification package 500 may alternatively initially created at the backup storage array R2 and transmitted to the primary storage array R1, and the data comparison may then be implemented on the primary storage array R1.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of remote data integrity verification on a remote data replication facility, comprising:
   receiving a write operation by a primary storage array, the write operation containing data to be written to a portion of a track on the primary storage array;
   creating a fingerprint of the data on the primary storage array;
   using the received write operation to update track temporal write metadata for the track on the primary storage array, the track temporal write metadata containing an indication of a cumulative number of write operations that have occurred on the track on the primary storage array;
   using the received write operation to update track spatial write metadata for the track on the primary storage array, the track spatial write metadata containing an indication of a spatial distribution of the cumulative write operations that have occurred on the track on the primary storage array;
   transmitting the write operation along with the updated track temporal write metadata and updated track spatial write metadata on a remote data replication facility to a backup storage array; and
   subsequently comparing the fingerprint of the data on the primary storage array, the track spatial write metadata on the primary storage array, and the track temporal write metadata on the primary storage array, with: a corresponding fingerprint of the data on the backup storage array, track spatial write metadata on the backup storage array, and track temporal write metadata on the backup storage array, respectively, to determine the integrity of the data at the backup storage array.

2. The method of claim 1, further comprising compressing the data on the primary storage array, wherein creating the fingerprint of the data is implemented in connection with compressing the data.

3. The method of claim 2, further comprising using the fingerprint of the data to implement deduplication of the data on the primary storage array.

4. The method of claim 1, wherein the track temporal write metadata is implemented using a set of track data version counters, each track data version counter being associated with a respective track, each track data version counter being incremented every time a write operation is implemented on the respective track.

5. The method of claim 1, wherein each track is divided into multiple sectors, and wherein the track spatial write metadata is implemented using a set of track sector signatures, each track data signature being associated with a respective track.

6. The method of claim 5, wherein each respective track sector signature is implemented using a multi-bit register having respective subsets of bits of the multi-bit register allocated to each sector of the respective track, and wherein respective subset of bits of the multi-bit register for a given sector are incremented each time a write operation occurs that spatially encompasses writing to the given sector of the respective track.

7. The method of claim 1, wherein subsequently comparing the fingerprint of the data on the primary storage array, the track spatial write metadata on the primary storage array, and the track temporal write metadata on the primary storage array, with the corresponding fingerprint of the data on the backup storage array, the track spatial write metadata on the backup storage array, and the track temporal write metadata on the backup storage array comprises:
   generating a remote data integrity verification package at the primary storage array, the remote data integrity verification package including a set of track verification quartets, each track verification quartet including track identification information of a given track, track signature of the given track, track spatial write metadata of the given track, and track temporal write metadata of the given track;
   transmitting the remote data integrity verification package from the primary storage array to the remote storage array;
   receiving the remote data integrity verification package at the remote storage array; and
   implementing a comparison process at the remote storage array for each track verification quartet included in the remote data integrity verification package.

8. The method of claim 1, wherein subsequently comparing the fingerprint of the data on the primary storage array, the track spatial write metadata on the primary storage array, and the track temporal write metadata on the primary storage array, with the corresponding fingerprint of the data on the backup storage array, the track spatial write metadata on the backup storage array, and the track temporal write metadata on the backup storage array comprises:
   generating a remote data integrity verification package at the remote storage array, the remote data integrity verification package including a set of track verification quartets, each track verification quartet including track identification information of a given track, track signature of the given track, track spatial write metadata of the given track, and track temporal write metadata of the given track;

transmitting the remote data integrity verification package from the remote storage array to the primary storage array;

receiving the remote data integrity verification package at the primary storage array; and implementing a comparison process at the primary storage array for each track verification quartet included in the remote data integrity verification package.

9. A system for remote data integrity verification on a remote data replication facility, comprising:

one or more processors and one or more storage devices storing instructions that are operable, when executed by the one or more processors, to cause the one or more processors to perform operations comprising:

receiving a write operation by a primary storage array, the write operation containing data to be written to a portion of a track on the primary storage array;

creating a fingerprint of the data on the primary storage array;

using the received write operation to update track temporal write metadata for the track on the primary storage array, the track temporal write metadata containing an indication of a cumulative number of write operations that have occurred on the track on the primary storage array;

using the received write operation to update track spatial write metadata for the track on the primary storage array, the track spatial write metadata containing an indication of a spatial distribution of the cumulative write operations that have occurred on the track on the primary storage array;

transmitting the write operation along with the updated track temporal write metadata and updated track spatial write metadata on a remote data replication facility to a backup storage array; and subsequently comparing the fingerprint of the data on the primary storage array, the track spatial write metadata on the primary storage array, and the track temporal write metadata on the primary storage array, with: a corresponding fingerprint of the data on the backup storage array, track spatial write metadata on the backup storage array, and track temporal write metadata on the backup storage array, respectively, to determine the integrity of the data at the backup storage array.

10. The system of claim 9, further comprising compressing the data on the primary storage array, wherein creating the fingerprint of the data is implemented in connection with compressing the data.

11. The system of claim 10, further comprising using the fingerprint of the data to implement deduplication of the data on the primary storage array.

12. The system of claim 9, wherein the track temporal write metadata is implemented using a set of track data version counters, each track data version counter being associated with a respective track, each track data version counter being incremented every time a write operation is implemented on the respective track.

13. The system of claim 9, wherein each track is divided into multiple sectors, and wherein the track spatial write metadata is implemented using a set of track sector signatures, each track data signature being associated with a respective track.

14. The system of claim 13, wherein each respective track sector signature is implemented using a multi-bit register having respective subsets of bits of the multi-bit register allocated to each sector of the respective track, and wherein respective subset of bits of the multi-bit register for a given sector are incremented each time a write operation occurs that spatially encompasses writing to the given sector of the respective track.

15. The system of claim 9, wherein subsequently comparing the fingerprint of the data on the primary storage array, the track spatial write metadata on the primary storage array, and the track temporal write metadata on the primary storage array, with the corresponding fingerprint of the data on the backup storage array, the track spatial write metadata on the backup storage array, and the track temporal write metadata on the backup storage array comprises:

generating a remote data integrity verification package at the primary storage array, the remote data integrity verification package including a set of track verification quartets, each track verification quartet including track identification information of a given track, track signature of the given track, track spatial write metadata of the given track, and track temporal write metadata of the given track;

transmitting the remote data integrity verification package from the primary storage array to the remote storage array;

receiving the remote data integrity verification package at the remote storage array; and implementing a comparison process at the remote storage array for each track verification quartet included in the remote data integrity verification package.

16. The system of claim 9, wherein subsequently comparing the fingerprint of the data on the primary storage array, the track spatial write metadata on the primary storage array, and the track temporal write metadata on the primary storage array, with the corresponding fingerprint of the data on the backup storage array, the track spatial write metadata on the backup storage array, and the track temporal write metadata on the backup storage array comprises:

generating a remote data integrity verification package at the remote storage array, the remote data integrity verification package including a set of track verification quartets, each track verification quartet including track identification information of a given track, track signature of the given track, track spatial write metadata of the given track, and track temporal write metadata of the given track;

transmitting the remote data integrity verification package from the remote storage array to the primary storage array;

receiving the remote data integrity verification package at the primary storage array; and implementing a comparison process at the primary storage array for each track verification quartet included in the remote data integrity verification package.

* * * * *